United States Patent [19]

Chaturvedi

[11] E Re. 28,471

[45] Reissued July 8, 1975

[54] Co-Ni-Cr BASE AUSTENTIC ALLOYS PRECIPITATION STRENGTHENED BY INTERMETALLIC COMPOUNDS AND CARBIDES

[76] Inventor: Mahesh C. Chaturvedi, 919-17 University Crescent, Winnipeg, Manitoba, Canada

[22] Filed: June 25, 1974

[21] Appl. No.: 483,053

Related U.S. Patent Documents

Reissue of:

[64] Patent No.: 3,790,372
Issued: Feb. 5, 1974
Appl. No.: 250,230
Filed: May 4, 1972

[52] U.S. Cl. ..... 75/134 F; 75/171
[51] Int. Cl. ..... C22c 19/00
[58] Field of Search ..... 75/134 F, 171

[56] References Cited

UNITED STATES PATENTS

| | | | |
|---|---|---|---|
| 2,206,502 | 7/1940 | Heiligman | 75/134 FX |
| 2,469,718 | 5/1949 | Edlund et al. | 75/171 |
| 2,617,725 | 11/1952 | Owens et al. | 75/134 FX |
| 3,183,082 | 5/1965 | Konecsni | 75/134 F |

*Primary Examiner*—L. Dewayne Rutledge
*Assistant Examiner*—E. L. Weise
*Attorney, Agent, or Firm*—Stanley G. Ade

[57] ABSTRACT

An alloy of Cobalt, Nickel and Chromium having a face, centered cubic structure and precipitation strengthened by intermetallic compounds or carbides. This alloy has high strength coupled with ductility and corrosion resistance making it particularly suitable for use in surgical or orthopedic implantation.

3 Claims, 5 Drawing Figures

FIG. 1

THE MECHANICAL PROPERTIES OF ALLOY 'A', AGED FOR 20 HOURS AT 800°C, AT VARIOUS TEMPERATURES.

| TESTING TEMP. °C | 0.2% YIELD STRENGTH x $10^3$ p.s.i. | U.T.S. x $10^3$ p.s.i. | % ELONGATION |
|---|---|---|---|
| ROOM TEMP. | 80 | 125 | 23 |
| 400 | 65 | 103 | 22 |
| 500 | 64 | 99 | 22 |
| 600 | 62 | 85 | 22 |
| 700 | 60 | 68 | 27 |
| 800 | 44 | 45 | 44 |

FIG. 2

THE EFFECT OF DEFORMATION ON THE MECHANICAL PROPERTIES OF ALLOY 'A', AGED FOR 20 HOURS AT 800°C.

| AMOUNT OF DEFORMATION | 0.2 % YIELD STRENGTH x $10^3$ p.s.i. | U.T.S. x $10^3$ p.s.i. | % ELONGATION |
|---|---|---|---|
| 5 | 135 | 155 | 12 |
| 8.5 | 155 | 165 | 6.5 |
| 15 | 162 | 178 | 5.5 |

FIG. 3

THE ROOM TEMPERATURE MECHANICAL PROPERTIES OF ALLOY 'B', AGED TO PEAK AT 800°C.

| 0.2 % YIELD STRESS x $10^3$ p.s.i. | U.T.S. x $10^3$ p.s.i. | % ELONGATION | HARDNESS (V.P.N.) |
|---|---|---|---|
| 155 | 200 | 10 | 400 |

FIG. 4

THE MECHANICAL PROPERTIES OF ALLOY 'C', AFTER VARIOUS THERMAL AND MECHANICAL TREATMENTS.

| TREATMENT | 0.2 % YIELD STRENGTH x $10^3$ p.s.i. | U.T.S. x $10^3$ p.s.i. | % ELONGATION |
|---|---|---|---|
| AGED TO PEAK | 78 | 110 | 15 |
| AGED TO PEAK + 5% DEFORMED | 145 | 153 | 3 |
| AGED TO PEAK + 10% DEFORMED | 200 | 202 | 2.7 |
| AGED TO PEAK + 15% DEFORMED | 200 | 215 | 2.7 |

FIG. 5

THE MECHANICAL PROPERTIES OF ALLOYS 'A' & 'B' AND OTHER SUPERALLOYS.

| ALLOYS | PROPERTIES | | |
|---|---|---|---|
| | 0.2 % YIELD STRENGTH x $10^3$ p.s.i. | U.T.S. x $10^3$ p.s.i. | % ELONGATION |
| INCONEL X-750 | 92 | 162 | 12 |
| HASTEALLOY B | 56 | 121 | 63 |
| INCONEL 718 | 175 | 212 | 22 |
| UDIMET 700 | 140 | 205 | 16 |
| RENÉ 41 | 154 | 206 | 14 |
| NIMONIC 100 | 118 | 181 | 18 |
| ALLOY 'A' | 80 | 125 | 23 |
| ALLOY 'B' | 155 | 200 | 10 |

Co-Ni-Cr BASE AUSTENTIC ALLOYS PRECIPITATION STRENGTHENED BY INTERMETALLIC COMPOUNDS AND CARBIDES

Matter enclosed in heavy brackets [ ] appears in the original patent but forms no part of this reissue specification; matter printed in italics indicates the additions made by reissue.

BACKGROUND OF THE INVENTION

Most ultra-high strength materials normally proposed for use as surgical implants and the like have poor ductility and poor corrosion properties. Conversely many alloys have good corrosion resistance but extremely poor strength and ductility.

SUMMARY OF THE INVENTION

This invention relates to new and useful alloys which although designed for use primarily as surgical implants, nevertheless can be used in other environments. These alloys have extremely high strength coupled with ductility and corrosion resistance.

The alloys are Cobalt, Nickel, Chromium based alloys having face centered cubic (austenitic) structure which are precipitation strengthened rather than being strengthened by deformation which results in a phase change.

Although a variety of alloys fall within this class, nevertheless the alloys of particular interest are those which have approximately between 35 percent and 45 percent Cobalt, between 35 percent and 45 percent Nickel and between 16 percent and 20 percent Chromium all by weight with a small percentage of intermetallic compounds to make up 100 percent, said compounds being taken from the group of Cobalt, Nickel, Titanium, Aluminium and Niobium and Carbon.

With the considerations and inventive objects herein set forth in view, and such other or further purposes, advantages or novel features as may become apparent from consideration of this disclosure and specification, the present invention consists of the inventive concept which is comprised, embodied, embraced [ , ] or included in the method, process, construction, composition, arrangement or combination of parts, or new use of any of the foregoing, herein exemplified in one or more specific embodiments of such concept.

BRIEF DESCRIPTION OF THE DRAWINGS

FIG. 1 is a table of the mechanical properties of one of the alloys aged for 20 hours at 800°C at various temperatures.

FIG. 2 is a table showing the effect of deformation on the mechanical properties of the alloy of FIG. 1.

FIG. 3 is a table showing the room temperature mechanical properties of another of the alloys.

FIG. 4 is a table showing the mechanical properties of a further alloy.

FIG. 5 is a table comparing the mechanical properties of two of the alloys with other well known super alloys.

DETAILED DESCRIPTION

As mentioned above, the present invention deals with Cobalt-Nickel-Chromium based alloys having face centered cubic (austenitic) structure which are precipitation strengthened by Sodium-Chloride type of carbides and different types of Cobalt, Nickel, Titanium, Aluminium and Niobium based intermetallic compounds.

Although many variations of the alloys can be formed, each having slightly different properties, nevertheless the basic composition by weight of the various components is between 35 percent and 45 percent Cobalt, between 35 percent and 45 percent Nickel, and between 16 percent and 20 percent Chromium with the balance of the various intermetallic compound forming elements to make up 100 percent.

As an example, two alloys are chosen which were precipitate strengthened by carbides and intermetallic compounds.

These alloys are identified as Alloy A and Alloy B and have the following formula:

Alloy A – 40 percent Co – 40 percent Ni – 18 percent Cr – 1.8 percent Nb – 0.2 percent C Alloy B – 40 percent Co – 38 percent Ni – 17 percent Cr – 5.0 percent Ti In the above examples, the following abbreviations have been used:

| | |
|---|---|
| Cobalt | Co |
| Nickel | Ni |
| Chromium | Cr |
| Niobium | Nb |
| Titanium | Ti |
| Aluminium | Al |

It should also be observed that in Alloy A, the quantities of Niobium and Carbon are equal insofar as atomic concentrations are concerned.

Alloy A on aging to a peak hardness at 700°C and 800°C developed a tensile strength of 110,000 p.s.i. and a percentage elongation of 12 percent and the various properties are shown in FIG. 1. It will be noted that the room temperature mechanical properties of this alloy can be further improved by cold working after aging to peak conditions and FIG. 2 shows the effect of cold deformation on the mechanical properties of this alloy aged for 20 hours at 800°C. In this regard it should be noted that if the deformation is more than 5 percent then the ductility is greatly reduced. Therefore not more than 5 percent deformation is recommended.

The strengthening phase has been identified as a niobium carbide which is a Sodium-Chloride type of structure (NaCl). Niobium carbide precipitates in association with stacking faults which provides better high temperature properties than conventional dislocation precipitation.

In the second alloy, namely Alloy B, the precipitation reaction at 700°C and 800°C raised the hardness value to 420–430 V.P.N. (Vickers Pyramid Hardness) giving an approximate tensile strength of 200,000 p.s.i. When this alloy is cold rolled 20 percent after being aged to peak condition, its hardness is 500 V.P.N. with an approximate tensile strength of 240,000 p.s.i. and FIG. 3 illustrates room temperature mechanical properties of this alloy aged to peak hardness at 800°C.

Also after 500 hours of aging at 800°C, this alloy does not overage whereas the first alloy tends to overage considerably. For this reason the applicability of the second alloy for high temperature applications is obvious.

Structural studies of Alloy B shows that the strengthening phase in this alloy is ordered $\gamma'$ phase which nucleates homogeneously throughout the matrix. This precipitate appears to have a very slow rate of growth and does not loose coherency with the matrix after 100 hours of aging at 800°C.

Corrosion studies show that Alloy A did not corrode at all after 20 days in a 0.17M NaCl solution at 60°C whereas conventional stainless steel commonly used for orthopedic implants corroded significantly.

Within the ranges of compounds given above, the following alloys show increased mechanical and corrosion properties in different environments and structural analysis as follows:

1. 40 percent Co – 40 percent Ni – 1.8 percent Nb – 0.2 percent C – 18 percent Cr
2. 40 percent Co – 40 percent Ni – 1.8 percent Ti – 0.2 percent C – 18 percent Cr
3. 40 percent Co – 38 percent Ni – 17 percent Cr – 3.5 percent Ti – 1.5 percent Al
4. 40 percent Co – 38 percent Ni – 17 percent Cr – 5 percent Ti
5. 40 percent Co – 38 percent Ni – 17 percent Cr – 3.5 percent Nb – 1.5 percent Al
6. 40 percent Co – 38 percent Ni – 17 percent Cr – 5 percent Nb These alloys are usable under the following circumstances and in the following applications.

1. Orthopedic implants.
2. Aerospace industry – corrosion-resistant fasteners, Aircraft control cables, etc.
3. Oceanographic cables and marine hardware.
4. High strength non-magnetic electrical components.
5. Coils and flat springs.

As an alternative to Alloy B, a sub-alloy B1 contains the following components:

40 percent Co – 38 percent Ni – 17 percent Cr – 3.5 percent Ti – 1.5 percent Al

The matrix of this alloy similar to that of Alloy B is also F.C.C. (Face centered cubic) and is precipitation strengthened by $\gamma'$ phase on aging at 700° to 900°C range. The room temperature mechanical properties of this alloy are identical to those of Alloy B. Moreover it is noted that the addition of the Aluminium increases the stability of $\gamma'$ phase. Therefore the high temperature properties of this alloy are slightly better than those of Alloy B.

A further alloy, namely Alloy C, consists of – 40 percent Co – 38 percent Ni – 17 percent Cr – 5 percent Nb.

The matrix of this alloy has also a F.C.C. structure and is precipitation strengthened by aging in 700°C to 900°C range. Two types of precipitates have been identified namely $Ni_3Nb$ in Body Centered Tetragonal and Orthorhombic crystal forms and the mechanical properties of this alloy are given in FIG. 4.

Certain low carbon steels exhibit discontinuous yielding and tensile deformation. Multiple strain-aging of these steels in the region of dicontinuous yielding has been observed to be a much more effective strengthening treatment than the normal strain-aging treatment. Furthermore, the ductility of the steel after multiple strain-aging treatment in the discontinuous yielding region is better than that of the steel subjected to strengthening by normal strain-aging treatment.

Alloy A, when deformed in the solution treated condition, in the 300–600°C temperature range exhibits discontinuous yielding. The other three alloys are also believed to exhibit this deformation behaviour. It is therefore likely that if these alloys were subjected to the multiple strain-aging treatments in the "Discontinuous Yielding" region, their mechanical properties will improve further. Since this treatment produces a very stable defect structure the creep properties of these alloys after this treatment will also improve.

These alloys have been developed mainly for orthopaedic implants, marine hardware, high temperature applications and the like and a determination of their suitability depends mainly on their corrosion behaviour.

When metals and alloys are exposed to a corrosive atmosphere they tend to acquire surface films of corrosion products. Subsequent corrosion depends upon the physical, chemical and electrical nature of the film. The nature of the film in these instances is studied by static "Potential-time" curve determination. They reveal the "over-potential" of the film and the weight loss of the specimen. If the over-potential of the film develops beyond a certain point, known as the "film-breakdown" potential, then the corrosion is extensive. The film-breakdown potential is determined by "potentiostatic" measurements.

Alloy A has been tested in 0.17M NaCl solution at 37°C and 60°C. This solution is used normally for testing materials used as orthopaedic implants. It was observed that after 60 days at 37°C and 40 days at 60°C the specimens did not suffer any weight loss and the steady state potential of the specimens were 250 mv and 400 mv at 37°C and 60°C, respectively.

The "film-breakdown" potential of Alloy A at 37°C was observed to be 800 mv. Therefore the film of corrosion products on the specimen will never breakdown and will provide an extremely good corrosion protection. As mentioned previously, the development of these alloys is primarily for use in orthopaedic implants. At present Vitallium and stainless steels are used for this purpose. Vitallium, although possessing good corrosion resistance and mechanical strength, lacks ductility and formability and as a result its application is considerably restricted.

Stainless steels possess sufficient strength, ductility and formability but lack an acceptable level of corrosion resistance. Alloy A in particular not only has corrosion properties similar to those of Vitallium but also has similar strength and formability to that of stainless steels so that therefore Alloy A combines the corrosion and strength properties of Vitallium and the formability of stainless steels and should find extensive use in orthopaedic implant applications.

The mechanical properties of Alloy A at high temperatures compares very well with those of "Nimonics" and other super alloys. It should be noted that at room temperature Alloy B is twice as strong as Alloy A therefore its high temperature strength properties would be even better.

Further examples of these alloys are given as follows:

Alloy A 35–45 percent Co, 35–45 Ni, 16–20 percent Cr, (Nb+C) to make up 100 percent.

Alloy B 35–45 percent Co, 35–45 percent Ni, 16–20 percent Cr, (Ti+Al) to make up 100 percent.

Alloy C 35–45 percent Co, 35–45 percent Ni, 16–20 percent Cr, (Nb+Al) to make up 100 percent.

Alloy D 35–45 percent Co, 35–45 percent Ni, 16–20 percent Cr, (Ti+C) to make up 100 percent.

It should be stressed that the difference between the present alloys and those hereinbefore known is twofold. Firstly, although at first glance the composition of the two alloys might look similar, it is in fact considerably different. Whereas the Nickel, Cobalt, and Chromium content are similar, many conventional alloys contain up to 10 percent Molybdenum whereas the alloys of the present invention have only one of the following (Nb+C), (Ti+C), (Ti+Al), or (Nb+Al).

Secondly, the strengthening mechanism in conventional alloys involves deformation which produces a phase change. This hexagonal phase will revert back to the original phase at high temperature with a consequent reduction in mechanical properties. By contrast the present alloys are basically age-hardening alloys.

Various modifications may be constructed or performed within the scope of the inventive concept disclosed. Therefore what has been set forth is intended to illustrate such concept and is not for the purpose of limiting protection to any herein particularly described embodiment thereof.

What I claim as my invention is:

1. An alloy having a face centered cubic structure consisting essentially of the combination by weight of between 35 percent and 45 percent Cobalt, between 35 percent and 45 percent Nickel, and between 16 percent and 20 percent Chromium, said alloy being precipitation strengthened by the addition of a compound to make up 100 percent by weight taken from the group comprising intermetallic compound and carbides, the intermetallic compound being selected from the group comprising Titanium, Niobium and Aluminium, the carbides being selected from the group comprising Titanium and Carbon, and [ Nickel ] *Niobium* and Carbon.

2. The alloy according to claim 1 in which the intermetallic compound comprises Titanium and Aluminium.

3. The alloy according to claim 1 in which the intermetallic compound comprises [ Nickel ] *Niobium* and Aluminium.

* * * * *